(12) United States Patent  
Breuer et al.

(10) Patent No.: US 12,386,164 B2  
(45) Date of Patent: Aug. 12, 2025

(54) METHOD OF DETERMINING A BRIGHTNESS OF A CHARGED PARTICLE BEAM, METHOD OF DETERMINING A SIZE OF A SOURCE OF THE CHARGED PARTICLE BEAM, AND CHARGED PARTICLE BEAM IMAGING DEVICE

(71) Applicant: ICT Integrated Circuit Testing Gesellschaft für Halbleiterprüftechnik mbH, Heimstetten (DE)

(72) Inventors: John Breuer, Munich (DE); Dominik Ehberger, Ebersberg (DE); Matthias Firnkes, Walpertskirchen (DE)

(73) Assignee: ICT Integrated Circuit Testing Gesellschaft für Halbleiterprüftechnik mbH, Heimstetten (DE)

( * ) Notice: Subject to any disclaimer, the term of this patent is extended or adjusted under 35 U.S.C. 154(b) by 554 days.

(21) Appl. No.: 17/966,385

(22) Filed: Oct. 14, 2022

(65) Prior Publication Data

US 2024/0126057 A1    Apr. 18, 2024

(51) Int. Cl.
| | |
|---|---|
| *G02B 21/00* | (2006.01) |
| *G01N 15/00* | (2024.01) |
| *G01N 15/0205* | (2024.01) |

(52) U.S. Cl.  
CPC ..... *G02B 21/0032* (2013.01); *G01N 15/0205* (2013.01); *G02B 21/006* (2013.01); *G02B 21/0076* (2013.01); *G01N 2015/03* (2013.01)

(58) Field of Classification Search  
CPC .............. G02B 21/0032; G02B 21/006; G02B 21/0076; G01N 15/0205; G01N 2015/03;

(Continued)

(56) References Cited

U.S. PATENT DOCUMENTS

| | | | |
|---|---|---|---|
| 2009/0179161 A1* | 7/2009 | Ward | H01J 37/08 250/424 |
| 2015/0110406 A1* | 4/2015 | Ohashi | H01J 37/28 382/199 |
| 2019/0244783 A1* | 8/2019 | Ohashi | H01L 22/12 |

FOREIGN PATENT DOCUMENTS

| | | | | |
|---|---|---|---|---|
| CN | 101882551 A | * | 11/2010 | H01J 9/02 |

OTHER PUBLICATIONS

De Jonge, N., Lamy, Y., Schoots, K. et al. High brightness electron beam from a multi-walled carbon nanotube. Nature 420, 393-395 (2002). https://doi.org/10.1038/nature01233 (Year: 2002).*

(Continued)

*Primary Examiner* — David E Smith  
*Assistant Examiner* — Christopher J Gassen  
(74) *Attorney, Agent, or Firm* — Kilpatrick Townsend & Stockton LLP

(57) ABSTRACT

A method of determining a brightness ($B_r$) of a charged particle beam (11) focused by a focusing lens (120) toward a sample (10) in a charged particle beam imaging device (100) is described. The method includes (a) taking one or more images ($h_{f, 1 \ldots N}$) of the sample with the charged particle beam imaging device; (b) retrieving one or more beam profiles ($g_{f, 1 \ldots N}$) of the charged particle beam from the one or more images; and (c) determining the brightness ($B_r$) of the charged particle beam (11) based on at least the one or more beam profiles ($g_f, g_{1 \ldots N}$), a probe current ($I_p$) of the charged particle beam, and a landing potential (LE) of the charged particle beam. Optionally, the brightness ($B_r$) determined as above can be used for determining a size ($D_{virt}$) of a source (105) of the charged particle beam (11). Further, a charged particle beam imaging device (100) configured for any of the methods described herein is provided.

20 Claims, 5 Drawing Sheets

(58) Field of Classification Search
CPC .......... H01J 37/222; H01J 37/28; H01J 37/09; H01J 37/147; H01J 37/265
See application file for complete search history.

(56) References Cited

OTHER PUBLICATIONS

Reisinger T., Greve M.M., Eder S.D., Bracco G., Holst B. Brightness and virtual source size of a supersonic deuterium beam. Phys. Rev. A, 86 (4) (2012), Article 043804, 10.1103/PhysRevA.86.043804 (Year: 2012).*

Å. Andersson, M. Böge, A. Lüdeke, V. Schlott, A. Streun. Determination of a small vertical electron beam profile and emittance at the Swiss Light Source, Nuclear Instruments and Methods in Physics Research Section A, vol. 591 (3), p. 437-446 (2008), https://doi.org/10.1016/j.nima.2008.02.095 (Year: 2008).*

Niels de Jonge; Brightness of carbon nanotube electron sources. J. Appl. Phys. Jan. 15, 2004; 95 (2): 673-681. https://doi.org/10.1063/1.1632551 (Year: 2004).*

* cited by examiner $$B_r = \frac{4 I_p}{\pi^2 d_{geo}^2 (NA)^2 (LE)}$$

$$D_{virt} = \sqrt{\frac{4\,I_b}{B_r \pi^2 \alpha^2 U_{ex}}}$$

METHOD OF DETERMINING A BRIGHTNESS OF A CHARGED PARTICLE BEAM, METHOD OF DETERMINING A SIZE OF A SOURCE OF THE CHARGED PARTICLE BEAM, AND CHARGED PARTICLE BEAM IMAGING DEVICE

TECHNICAL FIELD

Embodiments described herein relate to methods of determining the brightness of a charged particle beam, particularly an electron beam, generated by a source of charged particles and focused by a focusing lens toward a sample, for example, in an electron microscope, particularly in a scanning electron microscope (SEM). Specifically, the brightness of a charged particle beam in a charged particle beam imaging device is determined. Embodiments described herein further relate to methods of determining a size of a source of charged particles, particularly the virtual size of an electron emission tip, utilizing the determined brightness. Further described are charged particle beam imaging devices configured for carrying out the described methods.

BACKGROUND

Modern semiconductor technology has created a high demand for structuring and probing specimens in the nanometer or even in the sub-nanometer scale. Micrometer and nanometer-scale process control, inspection or structuring, is often done with charged particle beams, e.g. electron beams, which are generated, shaped, deflected and focused in charged particle beam imaging devices, such as electron microscopes or electron beam pattern generators. For inspection purposes, charged particle beams offer a superior spatial resolution compared to, e.g., photon beams.

Inspection apparatuses using charged particle beams, such as scanning electron microscopes (SEM), have many functions in a plurality of industrial fields, including, but not limited to, inspection of electronic circuits, exposure systems for lithography, detecting systems, defect inspection tools, and testing systems for integrated circuits. In such particle beam systems, fine beam probes with a high current density can be used. For instance, in the case of an SEM, the primary electron beam generates signal particles such as secondary electrons (SE) and/or backscattered electrons (BSE) that can be used to image and/or inspect a sample.

Charged particle beam imaging devices have a beam source, e.g., an electron source, for generating the charged particle beam that is used for sample inspection and/or imaging. The brightness of the charged particle beam is a key parameter for obtaining a high spatial resolution and at the same time a high throughput for microscopy and sample analysis. The (reduced) brightness of the charged particle beam is, at least in theory, conserved in the charged particle imaging device from the beam source to the sample. In particular, the brightness that is defined by characteristics of the beam source (i.e., by the emission tip and other charged particle emission parameters) cannot be increased after the generation of the charged particle beam.

However, there are generally uncertainties with respect to parameters of the charged particle beam, particularly with respect to the brightness of the charged particle beam. The brightness can be roughly estimated, e.g., based on an estimated physical size of the emission tip which emits the charged particles, or based on a spot size of the beam probe estimated by directing the focused charged particle beam (after magnification with specific magnifying optics) on a beam profiler. However, an accurate determination of the beam brightness is challenging. An accurate knowledge of the brightness can facilitate an identification of, e.g., variations of beam source parameters and, hence, beam probe parameters in a charged particle beam imaging device. Such variations could be identified by reliably determining and/or monitoring the brightness of the charged particle beam, which could be used for improved matching.

In view of the above, it would be beneficial to provide methods of accurately and reliably determining the brightness of a charged particle beam focused by a focusing lens in a charged particle beam imaging device. Further, it would be beneficial to provide a charged particle beam imaging device that is configured for being operated in accordance with any of the methods described herein, such that the charged particle beam imaging system can be accurately characterized in terms of the brightness of the charged particle beam and/or in terms of the size of the charged particle beam source.

SUMMARY

In light of the above, methods of determining a brightness of a charged particle beam, methods of determining a size of a source of the charged particle beam, and charged particle beam imaging devices are provided according to the independent claims.

According to a first aspect, a method of determining a brightness of a charged particle beam focused by a focusing lens toward a sample in a charged particle beam imaging device is provided. The method includes: (a) taking one or more images of the sample with the charged particle beam imaging device; (b) retrieving one or more beam profiles of the charged particle beam from the one or more images; and (c) determining the brightness ($B_r$) of the charged particle beam based on at least the one or more beam profiles, a probe current of the charged particle beam, and a landing potential of the charged particle beam.

In particular, a focus beam profile can be retrieved in (b), and the brightness can be determined based on at least the focus beam profile, the numerical aperture, the probe current, and the landing potential in (c). Alternatively or additionally, the numerical aperture of the charged particle beam can be determined based on one or more beam profiles determined in (b), and the brightness can be determined based on at least the numerical aperture, the focus beam profile, the probe current, and the landing potential in (c).

According to a second aspect, the brightness of the charged particle beam determined as specified herein is used for determining a size of the source of the charged particle beam, particularly for determining the virtual size of a charged particle emission tip, particularly of an electron emitter.

According to a third aspect, a method of determining a size of a source of a charged particle beam in a charged particle beam imaging device is provided, particularly the virtual size of an emission tip of an electron emitter. The method includes: generating the charged particle beam with the source; focusing the charged particle beam toward a sample with a focusing lens; determining a brightness of the charged particle beam according to any of the methods described herein; and determining the size of the source based on at least the brightness, a beam potential of the charged particle beam, a charged particle beam current, and a source opening angle.

According to a fourth aspect, a charged particle beam imaging device is provided, including a source for emitting a charged particle beam propagating along an optical axis; a sample stage; a focusing lens for focusing the charged particle beam toward a sample placed on the sample stage; a charged particle detector for detecting signal particles emitted from the sample; and a processor and a memory storing instructions that, when executed by the processor, cause the charged particle beam imaging device: (a) to take one or more images of the sample; (b) to retrieve one or more beam profiles of the charged particle beam from the one or more images; and (c) to determine a brightness of the charged particle beam based on at least the one or more beam profiles, a probe current of the charged particle beam, and a landing potential of the charged particle beam. The imaging device may be configured for carrying out any of the methods described herein.

Embodiments are also directed at apparatuses for carrying out the disclosed methods and include apparatus parts for performing the individual method actions. The methods may be performed by way of hardware parts, a computer programmed by appropriate software, by any combination of the two or in any other manner. Furthermore, embodiments are also directed at methods of operating the described apparatuses.

Further advantages, features, aspects and details that can be combined with embodiments described herein are evident from the dependent claims, the description and the drawings.

BRIEF DESCRIPTION OF THE DRAWINGS

So that the manner in which the above recited features of the present disclosure can be understood in detail, a more particular description, briefly summarized above, may be had by reference to embodiments. The accompanying drawings relate to one or more embodiments and are described in the following.

DETAILED DESCRIPTION

Figure 1:
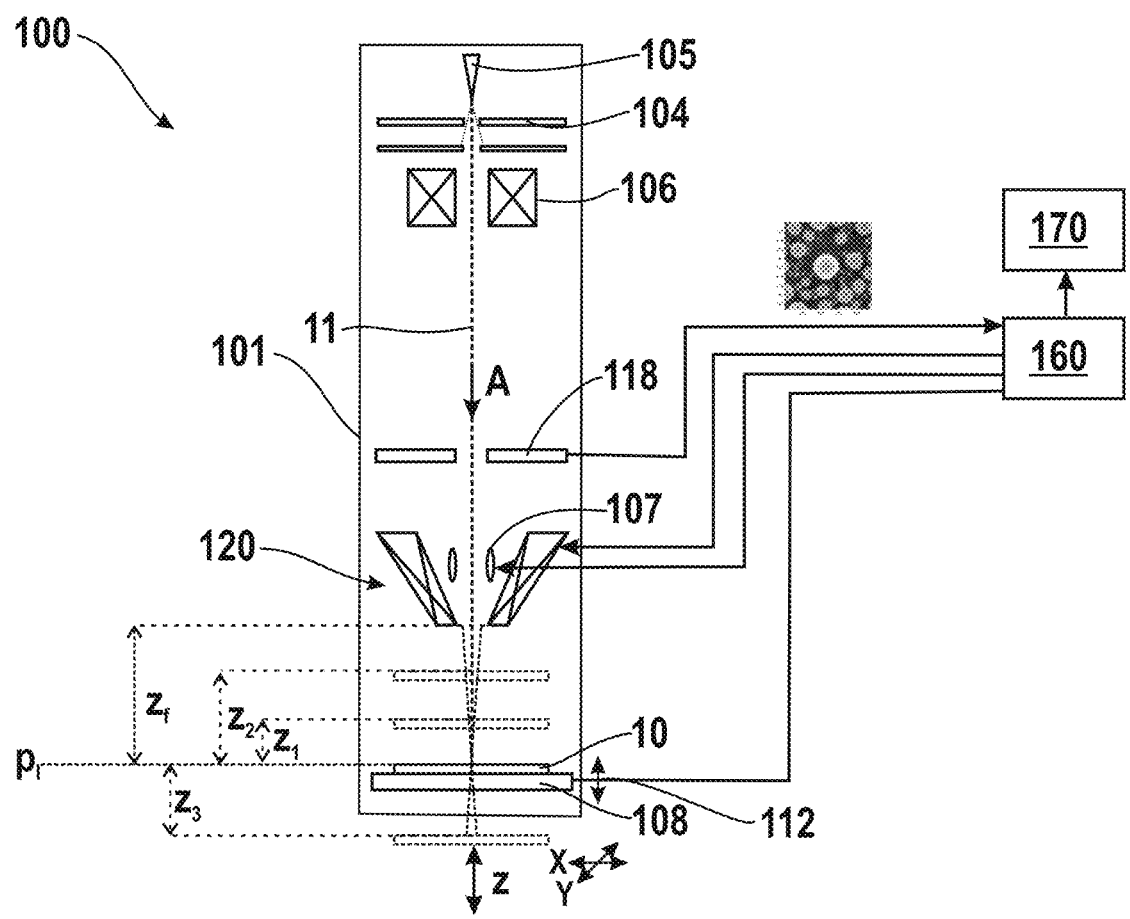
FIG. 1 shows a schematic view of a charged particle beam imaging device according to embodiments described herein that is configured for carrying out any of the methods described herein.

Reference will now be made in detail to the various embodiments, one or more examples of which are illustrated in the figures. Within the following description of the drawings, same reference numbers refer to same components. Generally, only the differences with respect to individual embodiments are described. Each example is provided by way of explanation and is not meant as a limitation. Further, features illustrated or described as part of one embodiment can be used on or in conjunction with other embodiments to yield yet a further embodiment. It is intended that the description includes such modifications and variations.

The brightness of the charged particle beam is a key parameter in charged particle beam imaging devices that can affect, e.g., the obtainable resolution, the signal/noise ratio and the throughput or inspection speed of the device. Since the (reduced) brightness of the charged particle beam is a parameter that is generally substantially conserved in charged particle beam imaging systems, the (reduced) brightness of the beam probe impinging on the sample generally substantially corresponds to the "brightness of the beam source" that emits the charged particle beam (=the brightness of the charged particle beam generated by the source). A small size of the emission tip of the source that emits the charged particle beam generally increases the beam brightness, because a large current is emitted per solid angle from a small tip area which can be focused toward a small spot size on the sample, providing a high-brightness beam probe. It is therefore generally an objective to provide a high-brightness source of charged particles with a small source size, i.e. a small size of the area from which the particles of the charged particle beam appear to originate when back-tracing the beam, while maintaining a large emission current.

While the "angular intensity" of a charged particle beam describes the number of charges (e.g., electrons) per unit time per solid angle, the brightness B is generally considered as a more relevant parameter, because the brightness refers to the angular intensity per source size, which is a parameter that characterizes the source of the charged particle beam and affects the obtainable resolution. If the "beam potential" varies along the optical axis, e.g. due to acceleration and/or deceleration sections, it is reasonable to use the "reduced" brightness $B_r$, which refers to the angular intensity per source size divided by the beam potential (in $[A/(m^2 \text{ sr } V)]$), which can be assumed as being conserved in the device even if the beam potential (=the energy of the particles of the charged particle beam) varies within the device along the optical axis. Instead of the term "reduced brightness", the term "normalized" brightness is sometimes used in the literature. The "beam potential" as used herein refers to the electric potential in [V] to which the charged particles of the beam are accelerated or decelerated, and which corresponds to the particle energy in electronvolts [eV] in case of electrons being the charged particles. If appropriate, e.g., in case of a high beam potential value, the relativistically corrected value of the beam potential may be used.

As used herein, the term "brightness" may refer to the reduced brightness $B_r$ of the charged particle beam, i.e., to the normalized brightness, which is considered as a conserved quantity in the charged particle beam imaging device (neglecting Coulomb-interactions between the charges). Specifically, the reduced brightness $B_r$ is considered as a conserved quantity throughout the beam column of the charged particle beam imaging device (neglecting Coulomb-interactions) and is a parameter related to both the source performance and the amount of current in the probe.

Determining the brightness of the charged particle beam is challenging. Conventionally, the brightness can be roughly estimated, e.g. based on assumed source parameters, which is not an accurate approach, because the emission characteristics of a tip may be different from what is expected. Alternatively, the brightness may be determined experimentally in a transmission electron microscope geometry by inserting specific magnifying optics into the charged particle beam, such that the beam focus can be magnified onto and measured by a CCD camera. The brightness can be calculated based on the magnified beam profile. However, inserting specific magnifying optics is complicated and may affect the determined brightness value, since the optics and beam path may be different from the optics that is used in the actual inspection device.

According to embodiments described herein, a method of accurately determining the (reduced) brightness $B_r$ of a charged particle beam in a charged particle beam imaging device is provided. The method is accurate, because the brightness in the charged particle beam imaging system can be determined based on actual images of a sample taken by the device, without using specific magnifying optics, and utilizing the actual device setup, without the need to use a specific microscope geometry.

More specifically, the brightness $B_r$ can be determined based on at least a beam convergence angle of the charged particle beam toward the focus spot (in particular, based on the numerical aperture NA of the charged particle beam) and based on the focus spot size of the charged particle beam (in particular, based on the focus spot diameter $d_{geo}$). At least one or both of the beam convergence angle (in particular, the NA) and the focus spot size (in particular, $d_{geo}$) are determined, according to embodiments described herein, from actual images taken of a sample, such that the determined brightness value is accurate and reliable, being retrieved based on actual images taken with the imaging device.

FIG. 1 is a schematic view of a charged particle beam imaging device 100 configured for the methods of determining the beam brightness described herein.

The charged particle beam imaging device 100 of FIG. 1 is configured for inspecting and/or imaging a sample 10 and includes a charged particle source 105, particularly an electron source with an emission tip, for emitting a charged particle beam 11, particularly an electron beam, propagating along an optical axis A. The charged particle beam imaging device 100 further includes a sample stage 108 and a focusing lens 120, particularly an objective lens, for focusing the charged particle beam 11 on the sample 10 that is placed on the sample stage 108. The charged particle beam imaging device 100 further includes a charged particle detector 118, particularly an electron detector, for detecting signal particles (e.g., secondary electrons and/or backscattered electrons) emitted from the sample 10. An image generation unit 160 may be provided that generates one or more images of the sample 10 based on the charged particle signal received from the charged particle detector 118. The image generation unit 160 can forward the one or more images of the sample to a processor 170, e.g., a computer, that may be configured to determine the brightness of the charged particle beam 11 in accordance with methods described herein.

Specifically, the processor 170 may include a processor and a memory storing instructions that, when executed by the processor, cause the charged particle beam imaging device 100 to determine the brightness of the charged particle beam according to any of the methods described herein.

The sample stage 108 may be a movable stage. In particular, the sample stage 108 may be movable in the Z-direction, i.e., in the direction of the optical axis A, such that the distance between the focusing lens 120 and the sample stage 108 can be varied (see arrow 112 in FIG. 1). By moving the sample stage 108 in the Z-direction, the sample 10 can be moved to different defocus distances away from a focal plane $p_f$ of the focusing lens 120, such that "out-of-focus images" of the sample 10 can be taken by a respective stage movement away from the beam focus. In some embodiments, the sample stage 108 may also be movable in a plane perpendicular to the optical axis A (also referred to herein as the X-Y-plane). By moving the sample stage 108 in the X-Y-plane, a predetermined surface region of the sample 10 can be moved into an area below the focusing lens 120, such that the predetermined surface region can be imaged or inspected by focusing the charged particle beam 11 thereon.

The beam-optical components of the charged particle beam imaging device 100 are typically placed in a vacuum chamber 101 that can be evacuated, such that the charged particle beam 11 can propagate along the optical axis A from the charged particle source 105 toward the sample stage 108 and hit the sample 10 under a sub-atmospheric pressure, e.g. a pressure below $10^{-3}$ mbar, a pressure below $10^{-5}$ mbar, or even a pressure below $10^{-8}$ mbar.

In some embodiments, the charged particle beam imaging device 100 may be an electron microscope, particularly a scanning electron microscope. A scan deflector 107 may be provided for scanning the charged particle beam 11 over a surface of the sample 10 along a predetermined scanning pattern, e.g., in the X-direction and/or in the Y-direction.

In some embodiments, a condenser lens system 106 (including one or more condenser lenses) may be arranged downstream of the charged particle source 105, particularly for collimating the charged particle beam 11 propagating toward the focusing lens 120. In some embodiments, the focusing lens 120 is an objective lens configured to focus the charged particle beam 11 on the sample 10, particularly a magnetic objective lens, an electrostatic magnetic lens, or a combined magnetic-electrostatic lens.

In some embodiments, an extractor electrode 104 may be arranged downstream of the charged particle source 105 and configured to extract the charged particle beam for propagation along the optical axis A by applying an extractor potential to the extractor electrode 104. Specifically, a beam acceleration potential, particularly a positive potential difference relative to the emission tip of the source 105, may be applied to the extractor electrode 104 for accelerating the charged particles, particularly the electrons, toward and through an opening of the extractor electrode 104. In some embodiments, the charged particle source 105 may be a cold field emitter (CFE), a thermal field emitter (TFE), or a Schottky emitter.

The charged particle source 105 may include a point-like tip which emits the charged particles of the charged particle beam. A tip with a small "physical size" (particularly <1 μm, <100 nm, or even <10 nm) is generally suitable to generate a high-brightness charged particle beam. Nevertheless, the "physical size" of the emission tip may not necessarily define the brightness of the source. The term "size" of the source of charged particles as used herein therefore generally refers to the virtual size of the source (also referred to herein as the "virtual source size"), which is the area from which the charged particles appear to originate within the beam source when back-tracing the charged particle beam. Specifically, the virtual size of the source may not necessarily designate the physical size of the emission tip, but may refer to the size of the virtual or real crossover of the charged particle beam formed by the field near the emission tip.

One or more surface regions of the sample 10 can be inspected and/or imaged with the charged particle beam imaging device 100. The term "sample" as used herein may relate to a substrate, e.g., with one or more layers or features formed thereon, a semiconductor wafer, a glass substrate, a web substrate, or another sample that is to be inspected. The sample can be inspected for one or more of imaging a surface of the sample, measuring dimensions of one or more features of the sample, e.g. in a lateral direction, i.e. in the X-Y-plane, conducting critical dimension measurements and/or metrology, detecting defects, and/or investigating the quality of the sample.

For inspecting the sample 10 with the charged particle beam 11, the charged particle beam 11 is typically focused on the sample surface with the focusing lens 120. Secondary electrons and/or backscattered electrons (referred to as "signal electrons") are emitted from the sample when the charged particle beam 11 impinges on the sample surface. The signal electrons provide information about spatial characteristics and dimensions of features of the sample and can be detected with the charged particle detector 118. By scanning the charged particle beam 11 over the sample surface, e.g. with the scan deflectors 107, and detecting the signal electrons as a function of the generation position of the signal electrons, the sample surface or a portion thereof can be imaged, e.g., with the image generation unit 160 that may be configured to provide an image of the sample 10 based on the received signal electrons.

A small spot of the focused charged particle beam 11 on the sample surface generally increases the image resolution. Accordingly, during actual sample inspection, the sample surface is generally arranged substantially in the focal plane $p_I$ of the focusing lens 120, in order to obtain an in-focus image of the sample 10. An image of the sample 10 taken in-focus is also referred to herein as a "focus image $h_f$". Similarly, the beam profile of the charged particle beam 11 in the focal plane $p_I$ is referred to herein as a "focus beam profile $g_f$".

An image can be mathematically presented in real space (=in the image domain, i.e. as a function of the spatial coordinates) or in Fourier space (=in the frequency domain, i.e. as a function of spatial frequency). An image in Fourier space can be calculated from an image in real space via a Fourier transformation (FT). Both above representations contain corresponding information of the image. As used herein, images in real space are designated with the small letter "$h_n$" and images in Fourier space are designated by the capital letter "$H_n$". Similarly, beam profiles in real space are designated herein with the small letter "$g_n$", and beam profiles in Fourier space are designated herein by the capital letter "$G_n$". Images and beam profiles in real space can be Fourier transformed into Fourier space, and vice versa, via Fourier transformation, e.g., via a fast Fourier transform (FFT) algorithm.

Figure 2:
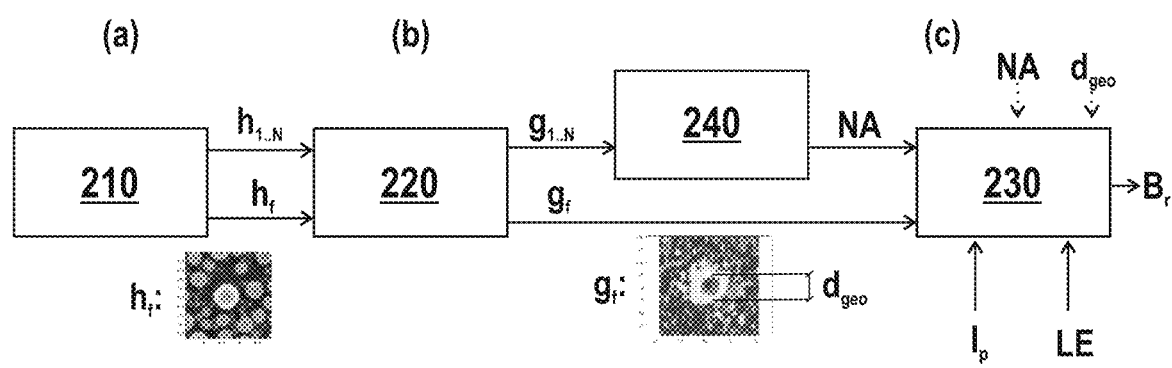
FIG. 2 shows a schematic flow diagram illustrating a method of determining a brightness $B_r$ of a charged particle beam according to embodiments described herein.

FIG. 2 schematically illustrates a method of determining the brightness $B_r$ of the charged particle beam focused by the focusing lens 120 toward the sample 10 in a charged particle beam imaging device, e.g., in the charged particle beam imaging device 100 of FIG. 1.

In box 210—also referred to herein as method action (a)—one or more images of the sample are taken, specifically at least one focus image $h_f$ (=an image taken when the sample is arranged at a beam focus of the charged particle beam, e.g., at the distance $z_f$ in FIG. 1) and/or one or more defocus images $h_{1\ldots N}$ (=one or more out-of-focus images taken when the sample is arranged at one or more defocus distances from a respective beam focus, e.g., at the distances $z_1$, $z_2$ and/or $z_3$ in FIG. 1).

In box 220—also referred to herein as method action (b)—one or more beam profiles of the charged particle beam are retrieved from the one or more images taken in (a).

Specifically, a focus beam profile $g_f$ may be retrieved from at least one focus image $h_f$ taken in (a), and/or one or more defocus beam profiles $g_{1\ldots N}$ may be retrieved from the one or more defocus images $h_{1\ldots N}$ taken in (a). In some implementations, the one or more beam profiles are retrieved from the one or more images based on a deconvolution. Specifically, deconvolving the focus beam image $h_f$ may result in the focus beam profile $g_f$, and deconvolving a defocus beam image $h_1$ may result in the respective defocus beam profile $g_1$ of the charged particle beam.

The one or more retrieved beam profiles (the focus beam profile $g_f$ and/or one or more defocus beam profiles $g_{1\ldots N}$) can be used for determining the brightness $B_r$ of the charged particle beam, particularly by calculation, simulation and/or fitting. Specifically, in box 230—also referred to herein as method action (c)—the brightness $B_r$ of the charged particle beam is determined based on the one or more beam profiles retrieved in (b), wherein additional beam parameters are typically used for the determination, particularly the probe current ($I_p$) of the charged particle beam, and/or the landing potential (LE) (or landing energy) of the charged particle beam on the sample.

More particularly, in some embodiments, the numerical aperture (NA) of the charged particle beam can be retrieved from one or more defocus beam profiles $g_{1\ldots N}$ retrieved in (b) (illustrated by box 240 in FIG. 2), and the brightness $B_r$ of the charged particle beam can be determined based on the numerical aperture (NA), the focus beam profile $g_f$ of the charged particle beam retrieved in (b), the probe current ($I_P$) and the landing potential (LE). For example, the brightness can be calculated using the following formula:

$$B_r = \frac{4 I_p}{\pi^2 d_{geo}^2 (NA)^2 (LE)} \quad \text{(Formula 1)}$$

wherein NA is the numerical aperture of the charged particle beam, $I_P$ is the probe current, LE corresponds to the beam potential in the landing plane, i.e., the landing potential (that generally has the same value if expressed as a potential in [V] or as the landing energy expressed in electronvolts [eV], and is therefore generally abbreviated as LE herein), and $d_{geo}$ is the focus spot diameter of the charged particle beam determined from the focus beam profile $g_f$. It is noted that, if appropriate (e.g., in case of a high electron landing energy >10 keV), the relativistically corrected value may be used for the landing potential, wherein the relativistically corrected value $U_{cor}$ can be calculated from the respective uncorrected value U as follows:

$$U_{cor} = U\left(1 + \frac{e}{2\,mc^2}U\right).$$

The probe current $I_p$ refers to the current of the charged particle beam probe impinging on the sample, typically expressed in Amperes [A], which is a quantity that can be determined, e.g., by a respective beam current measurement.

The landing potential (LE) of the charged particle beam refers to the electric potential to which the charged particles of the beam have been accelerated and/or decelerated when impinging on the sample. If the charged particles are electrons, the landing potential in [V] generally corresponds to the energy of the electrons of the charged particle beam impinging on the sample expressed in electronvolts [eV], such that "landing potential" and "landing energy" can be interchangeably used herein for the respective quantity.

In some embodiments, which can be combined with other embodiments described herein, the method includes, in box 240, the determination of the numerical aperture (NA) of the charged particle beam based on the one or more beam profiles $g_1 \ldots _N$ determined in (b), wherein, in (c), the brightness is determined based on at least the numerical aperture (NA), the probe current ($I_p$) and the landing potential (LE).

The numerical aperture (NA) of a charged particle beam is a magnitude that is typically used by the skilled person to describe the beam convergence of the charged particle beam focused on the sample surface by the objective lens. The charged particle beam imaging device may be designed for a specific numerical aperture, but the actual numerical aperture may deviate from the expected value. Knowledge of the actual value of the numerical aperture (NA) of the charged particle beam, is beneficial for accurately determining other parameters, including the brightness $B_r$ of the charged particle beam. The brightness $B_r$ (determined at the focal spot) depends on the solid angle of the charged particle beam (i.e., the beam convergence angle, expressed by the numerical aperture NA) that is focused by the focusing lens toward the sample. It is alternatively possible (see dashed arrow in FIG. 2) to estimate the numerical aperture (NA) based on the distance of the focusing lens from the sample and based on the beam aperture provided by the focusing lens. A more accurate value of the numerical aperture can be obtained as described herein based on one or more defocus beam profiles $g_1 \ldots _N$, such that also a more accurate brightness value $B_r$ can be obtained.

The numerical aperture (NA) can be determined as follows: In (a), one or more defocus images $h_1 \ldots _N$ of the charged particle beam are taken when the sample is arranged at one or more defocus distances $z_1 \ldots _N$ from a respective beam focus of the charged particle beam. In (b), one or more defocus beam profiles $g_1 \ldots _N$ are retrieved from the one or more defocus images $h_1 \ldots _N$, particularly based on a deconvolution, and one or more beam widths $c_1 \ldots _N$ are determined from the one or more defocus beam profiles $g_1 \ldots _N$. The numerical aperture (NA) of the charged particle beam can be calculated based on the one or more beam widths $c_1 \ldots _N$ and the one or more defocus distances $z_1 \ldots _N$, particularly based on dc/dz which expresses a variation of the beam width as a function of the defocus distance.

In some embodiments, the one or more defocus distances $z_1 \ldots _N$ at which the one or more defocus images $h_1 \ldots _N$ are taken, or differences between the one or more defocus distances $z_1 \ldots _N$, are known in absolute values, and said absolute values are used for calculating the numerical aperture (NA).

In some embodiments, the numerical aperture (NA) of the charged particle beam can be calculated based on an average change of beam width as a function of defocus distance, optionally using a calibration factor (K).

Figure 3:
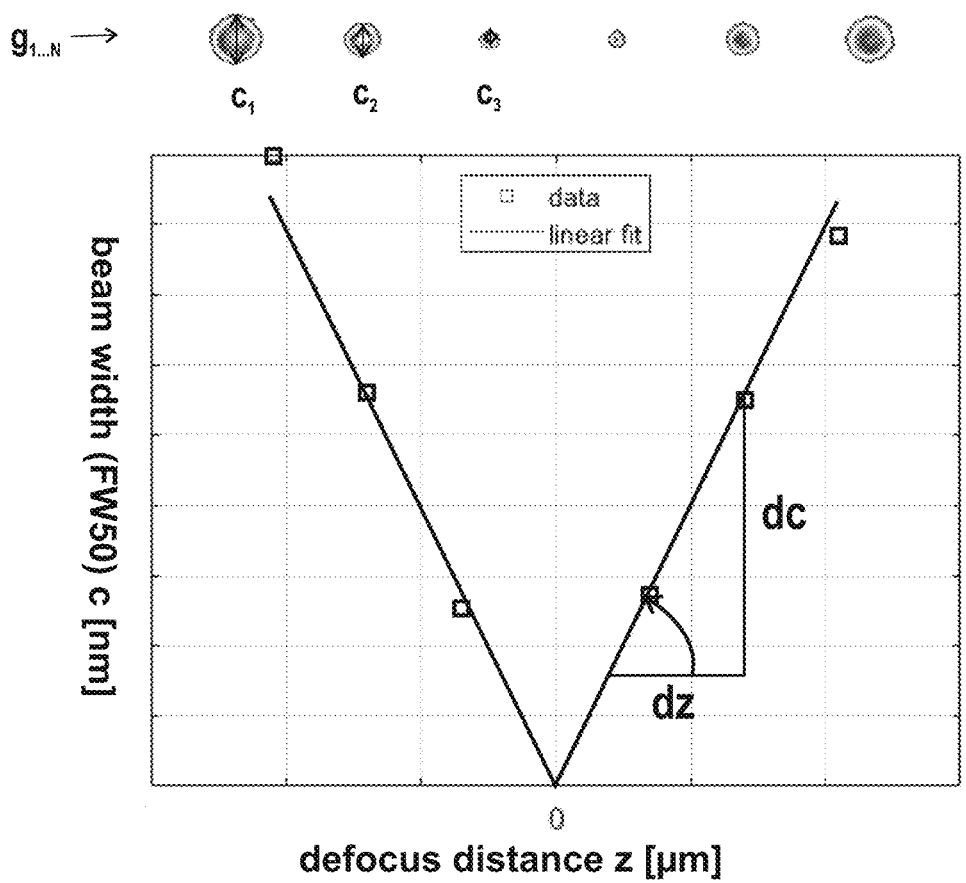
FIG. 3 is a graph illustrating a determination of a numerical aperture (NA) of a charged particle beam to be used for determining the brightness according to embodiments described herein.

FIG. 3 is a graph that illustrates a determination of the numerical aperture (NA) of a charged particle beam based on one or more defocus beam profiles $g_1 \ldots _N$. The beam width (c) is shown in the graph as a function of defocus distance (z) in an exemplary defocus range from −20 µm to +20 µm relative to the beam focus (here: z=0). In the depicted example, three images are taken at different (quantitatively known) underfocus distances, and three images are taken at different (quantitatively known) overfocus distances, the respective beam profiles $g_1 \ldots _N$ are retrieved from the images, e.g., based on a deconvolution, and the respective beam widths $c_1 \ldots _N$ are determined from the beam profiles.

Here, the FW50-widths are taken from the beam profiles, but methods described herein are not limited in this respect (e.g., the FWHM, the $1/e^2$-width, or another commonly used magnitude that describes the beam width could be used). The beam widths $c_1 \ldots _N$ are shown in the graph as small squares at the respective defocus distances.

In the graph, the change of beam width as a function of defocus distance $$\left(\frac{dc}{dz}\right)$$

corresponds to the slope of a line that connects the beam widths (or a linear fit thereto). Typically, the absolute values of the slopes upstream and downstream of the beam focus (z=0) essentially correspond to each other, because the charged particles of the beam propagate along essentially linear paths.

In some embodiments, an average slope, in particular the slope of a linear fit to at least some of the beam width values as a function of defocus distance, is determined, and the beam convergence angle can be calculated therefrom. In some embodiments, the numerical aperture (NA) of the charged particle beam is calculated from the (averaged or fitted) slope value by multiplying the slope value $$\left(\frac{dc}{dz}\right)$$

with a calibration factor (K). The calibration factor (K) may take into account the magnitude (e.g., FW50 or FWHM) that is used as the beam width. In some embodiments, the numerical aperture (NA) is calculated as follows: NA=K·|slope (FW50)|, if "FW50"(=full width 50) is used as the magnitude for expressing the beam width and "slope" is the (optionally, averaged or linearly fitted) absolute value of $$\left(\frac{dc}{dz}\right),$$

wherein the calibration factor (K) is a value between 0.5 and 1, particularly a value between 0.6 and 0.9.

The resulting numerical aperture (NA) of the charged particle beam (for example, NA=7 mrad) can be used for calculating or otherwise determining the brightness $B_r$, e.g., using (Formula 1).

In some embodiments, the one or more defocus images $h_1 \ldots _N$ are taken as follows. A plurality of different focusing strengths can be applied by the focusing lens 120 for varying between a plurality of different defocus distances, and an image can be taken by the charged particle beam imaging device 100 at each of the plurality of different focusing strengths of the focusing lens 120. In particular, the defocus distance variation as a function of focusing strength of the focusing lens 120 may be known or may be determined in a preceding calibration. Alternatively, the sample stage 108 can be moved relative to the focusing lens 120 along the optical axis for varying between a plurality of different defocus distances, and an image can be taken at each of the plurality of different focusing distances. In other words, the defocus distance can be varied by varying the focusing strength of the focusing lens 120 and/or by varying the z-position of the sample stage 108, which are both suitable for moving the sample between different defocus positions, such that one or more defocus images can be taken.

In some implementations, at least one image is taken at an overfocus distance and at least one image is taken at an underfocus distance. Particularly, several overfocus images can be taken and several underfocus images can be taken, the respective beam profiles can be retrieved therefrom, and the NA can be determined based on the beam profiles and the respective over-/underfocus distances, as is schematically illustrated in FIG. 3.

In some embodiments, retrieving the one or more beam profiles $g_{1...N}$ from the one or more images $h_{1...N}$ includes a deconvolution, particularly a deconvolution with a high-resolution image of the sample. Alternatively or additionally, retrieving the one or more beam profiles $g_{1...N}$ from the one or more images $h_{1...N}$ may include dividing the one or more images in Fourier space by a high-resolution image of the sample in Fourier space. Such a division in Fourier space can be considered equivalent to a deconvolution.

A "high-resolution image" may be understood as an image of the sample that has a higher resolution than the image that is deconvolved using the high-resolution image or that is divided in Fourier space by the high-resolution image for obtaining the respective beam profile. For example, the resolution of the high-resolution image may be improved by at least 30% or by at least 50% relative to the resolution of the image whose beam profile is to be retrieved. In some embodiments, the high-resolution image of the sample is taken with the charged particle beam imaging device as a focus image of the sample, particularly with a device setting configured to provide high-resolution images, e.g., with a diffraction limited focal spot on the sample. Alternatively, the high-resolution image of the sample may be available otherwise, e.g., because details of the sample surface are already known or because a known sample is used for the brightness determination.

The above beam profile extraction method is based on the fact that dividing a taken image of a sample by a high-resolution image of the sample in Fourier space, which is equivalent to a deconvolution of the defocus image by the high-resolution image, removes the structure of the sample from the image, such that said division or deconvolution can yield the pure beam profile, i.e. the beam cross section without sample information.

Returning to FIG. 2, in some embodiments which can be combined with other embodiments described herein, at least one image $h_f$ of the sample is taken in method action (a) when the sample is arranged at a beam focus of the charged particle beam, which is also referred to herein as a "focus image $h_f$" of the sample. In (b), at least one focus beam profile $g_f$ is retrieved from the at least one image $h_f$ taken in-focus.

In some embodiments, the at least one focus beam profile $g_f$ is retrieved from the at least one image $h_f$ based on a deconvolution, particularly based on a deconvolution with a high-resolution image of the sample. Alternatively, retrieving the at least one focus beam profile $g_f$ from the at least one image $h_f$ may include dividing the at least one image in Fourier space by a high-resolution image of the sample in Fourier space. As mentioned above, a "high-resolution image" of the sample may be understood as an image of the sample that has a higher resolution (e.g., improved by 30% or more, particularly by 50% or more) than the image that is deconvolved using the high-resolution image or that is divided in Fourier space by the high-resolution image for obtaining the respective beam profile.

In some embodiments, which can be combined with other embodiments described herein, the method further includes taking a high-resolution image of the sample, e.g., at a different setting of the charged particle beam imaging device that is adapted for generating high-resolution images, particularly with a second resolution that is better than a first resolution of the one or more images taken in (a). The one or more beam profiles may be retrieved in (b) by deconvolving the one or more images taken in (a) with the high-resolution image of the sample, or said retrieval may include a division in Fourier space of the one or more images by the high-resolution image. For example, for obtaining the high-resolution image of the sample, the device settings may be such as to provide a high-resolution image, e.g., by providing a diffraction-limited spot size with a low-current charged particle beam having a large numerical aperture. Alternatively, the high-resolution image of the sample that is used for retrieving the one or more beam profiles from the one or more taken images can be available otherwise, e.g., because details of the sample are known in advance, e.g. because a known sample is imaged in (a).

In (c), the brightness $B_r$ of the charged particle beam may be determined based on the focus beam profile $g_f$, the numerical aperture (NA) (which can be determined as explained above or which can be determined otherwise), the probe current ($I_p$), and the landing potential (LE).

In particular, the focus spot size of the charged particle beam, particularly the focus spot diameter $d_{geo}$, more particularly the full width 50 diameter (FW50-diameter) of the charged particle beam may be retrieved from the focus beam profile $g_f$, and the brightness of the charged particle beam may be determined based on the focus spot size, the numerical aperture (NA), the probe current ($I_p$), and the landing potential (LE), particularly using (Formula 1).

In some embodiments, which can be combined with other embodiments described herein, the charged particle beam may be an electron beam that has one or more of the following parameters: the probe current ($I_p$) may be in a range from 1 nA to 5 nA, the landing potential (LE) may correspond to a landing energy in a range from 200 eV to 5 keV, and/or the numerical aperture (NA) may be in a range from 3 mrad to 10 mrad. The focus spot diameter $d_{geo}$ of the charged particle beam retrieved from the focus beam profile $g_f$, may, for example, be in a range from 5 nm to 15 nm.

Example 1 (Brightness Determination Via Calculation)

An exemplary method of determining a beam brightness according to embodiments described herein is carried out as follows.

A high-resolution image of the sample may be already available or can be taken with the charged particle beam, for example using a high-resolution device setting suitable for taking a high-resolution image, e.g., a small probe current (e.g., 50-100 pA) focused with a comparatively large numerical aperture (e.g., 10-20 mrad). For example, the high-resolution image of the sample can be taken with a diffraction-limited focus spot that provides a resolution of, e.g., 3 nm or less, e.g., about 1 nm. The high-resolution image of the sample can later be used for retrieving beam profiles from taken images, e.g., based on a deconvolution of the taken images.

Optionally, the actual brightness determination process can be conducted at a different device setting, namely at a brightness-limited working point, which may not be optimized for obtaining high-resolution images, but which may rather use a focus beam profile that allows identification of the actual geometric spot size, because the beam profile is not dominated by other contributions, such as diffraction, chromatic blur and/or spherical blur contributions. At a brightness-limited working point, the charged particle beam is focused by the focusing lens toward the sample such that the focus spot size is brightness-limited, particularly such that the geometric spot size is bigger than each of a diffraction contribution, a chromatic blur contribution, and a spherical blur contribution to the focus spot size of the charged particle beam.

Spherical and chromatic blur contributions to the focus spot size generally increase with the numerical aperture, while the diffraction contribution decreases with the numerical aperture. The geometric spot size, which corresponds to the demagnified virtual source size depends on the magnification of the optical system. Generally, the magnification decreases with an increasing numerical aperture and, therefore, the geometric spot size decreases with the numerical aperture as well. The abovementioned contributions to the focus spot size generally also depend on the probe current. The brightness determination according to embodiments described herein is beneficially conducted at a brightness-limited working point, at which the focus spot size is mainly defined by the actual geometric spot size, and contributions of diffraction and blur to the beam profile are comparatively small. This may allow a retrieval of the geometric spot size directly from the focus beam profile, without considering distortions/changes to the focus beam profile caused by diffraction and/or aberration(s). For example, the brightness determination according to embodiments described herein may be conducted with a probe current in a range of 1 nA or more and 5 nA or less, and/or with a numerical aperture in a range of 3 mrad or more and 10 mrad or less, which may provide a brightness-limited focus spot. The brightness-limited working point of the device is not necessarily suitable for taking high-resolution images of the sample, but is rather suitable for providing a focus beam profile that is primarily defined by the geometric spot and is therefore beneficial for brightness determination.

The landing potential (LE) may be known, e.g., since the electrostatic potential applied to the charged particle beam impinging on the sample is known. The probe current $I_p$ may be known as well, e.g. since the setting of a beam limiting aperture that defines the probe current is known, or the probe current can be measured. For example, the landing potential may be about 500 V, corresponding to a landing energy of about 500 eV, and the probe current ($I_p$) may be about 2 nA.

The numerical aperture NA may be determined as described above, particularly by taking one or more images of the sample at one or more defocus distances, by retrieving one or more beam profiles from the one or more images, by determining one or more beam widths from the one or more beam profiles, and by calculating the numerical aperture of the charged particle beam based on the one or more beam widths and the one or more defocus distances. For example, the NA may be about 7 mrad (see above example).

The focus beam profile $g_f$ may be retrieved from at least one image $h_f$ of the sample taken in-focus, particularly based on a deconvolution with a high-resolution image of the sample. The focus spot size, particularly the focus spot diameter $d_{geo}$, can be retrieved directly from the focus beam profile $g_f$, e.g., as a FW50-diameter, particularly if the focus image $h_f$ is taken at a brightness-limited working point of the device. For example, the focus spot diameter $d_{geo}$ may be determined to be about 9 nm (see FIG. 2).

Based on the above exemplary parameter values, the brightness $B_r$ can be determined via calculation based on (Formula 1) as follows:

$$B_r = \frac{4 * 2 \; nA}{\pi^2 (9 \text{ nm})^2 (7 \text{ mrad})^2 (500 \text{ V})} \approx 4 \cdot 10^8 \frac{A}{m^2 sr \; V}$$

Accordingly, in "Example 1", the (reduced) brightness $B_r$ of the charged particle beam is determined to be about $$4 \cdot 10^8 \frac{A}{m^2 sr \; V}$$

Example 2 (Brightness Determination Via Fitting)

Figure 4:
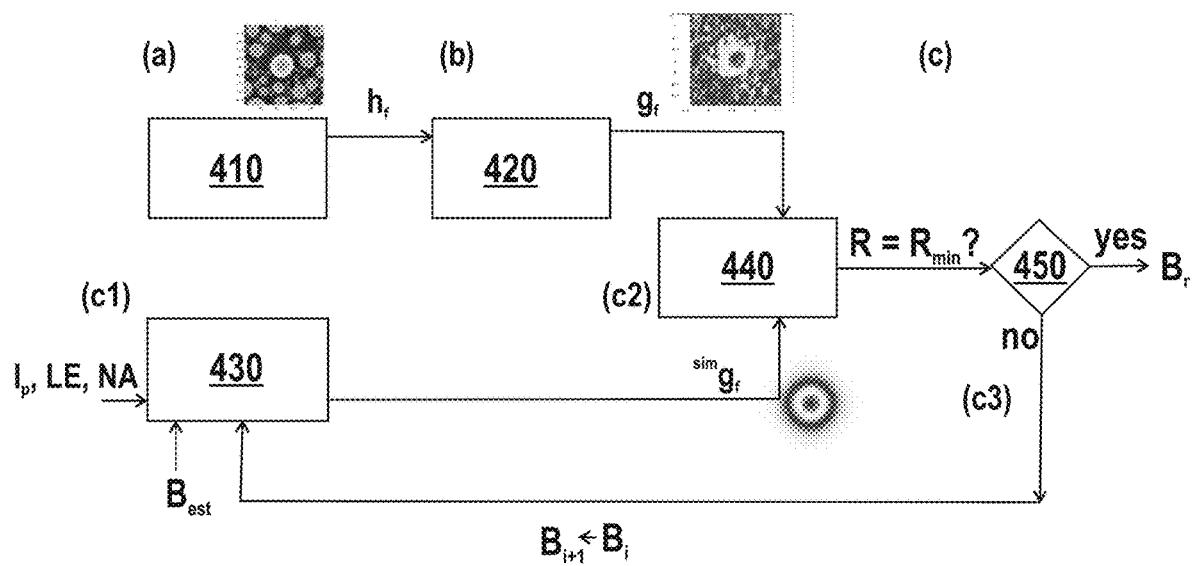
FIG. 4 is a schematic flow diagram illustrating a method of determining a brightness $B_r$ of a charged particle beam according to some embodiments described herein.
Figure 4:
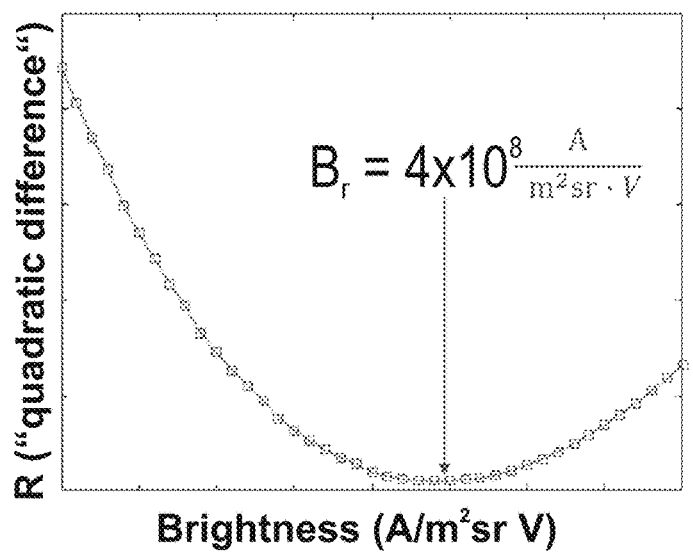

FIG. 4 shows a schematic flow diagram that illustrates an alternative method of determining the brightness ($B_r$) of the charged particle beam according to embodiments described herein.

In box 410—also referred to herein as method action (a)—one or more images of the sample are taken with the charged particle imaging device, particularly—but not necessarily—at a brightness-limited device setting as explained above. The one or more images may include at least one focus image $h_f$ of the sample which can be used for retrieving the focus beam profile $g_f$ and/or one or more defocus images $h_1 \ldots_N$ which can be used for determining the numerical aperture NA.

In box 420—also referred to herein as method action (b)—one or more beam profiles of the charged particle beam are retrieved from the one or more images, particularly—but not necessarily—based on a deconvolution with a high-resolution image as explained above. The focus beam profile $g_f$ may be retrieved from the at least one focus image $h_f$.

Thereafter—also referred to herein as method action (c)—the brightness $B_r$ of the charged particle beam may be determined based on the focus beam profile $g_f$, the numerical aperture (NA) (determined as illustrated in FIG. 3 or otherwise), the probe current ($I_P$), and the landing potential (LE) as follows.

In box 430—referred to herein as method action (c1)—a focus beam profile may be simulated using at least the numerical aperture (NA), the probe current ($I_P$), the landing potential (LE), and an estimated brightness ($B_{est}$) of the charged particle beam as input parameters, to provide a simulated focus beam profile $^{sim}g_f$. The simulation of the simulated beam profile can be carried out, e.g., based on a wave-optical simulation of a beam cross section in focus. The estimated brightness may be a rough estimation of the brightness of the charged particle beam, e.g., based on conventionally used estimation values or based on values published in the literature.

In box 440—referred to herein as method action (c2)—the simulated focus beam profile $^{sim}g_f$ is compared with the focus beam profile $g_f$ retrieved in (b) for determining a magnitude (R) of a difference therebetween.

In box 450—referred to herein as method action (c3)—the estimated brightness ($B_{est}$) is varied to provide an updated brightness ($B_{i+1}$), and (c1) and (c2) are repeated using the updated brightness ($B_{i+1}$) instead of the initially used estimated brightness ($B_{est}$), etc., in an iterative process for minimizing the magnitude (R) of the difference between the focus beam profile $g_f$ and the respective simulated focus beam profile.

In particular, method actions (c1) and (c2) may be repeated until a minimized magnitude ($R_{min}$) of the difference between the simulated focus beam profile $^{sim}g_f$ and the retrieved focus beam profile $g_f$ is obtained, and the updated brightness at the iteration at which the magnitude of the difference is minimized may be determined as corresponding to the brightness ($B_r$) of the charged particle beam.

For example, the quadratic difference between the simulated focus beam profile $^{sim}g_f$ and the retrieved focus beam profile $g_f$ may be minimized in an iterative process or in a fitting process (varying the brightness used for the respective simulation), until the minimum of the difference therebetween is obtained, and the brightness value that was used for obtaining the minimum difference is determined as the brightness of the charged particle beam.

As is schematically illustrated by the graph in the lower part of FIG. 4, the "brightness fitting method" of "Example 2" leads to a brightness value, e.g., a brightness value of about $$4 \cdot 10^8 \frac{A}{m^2 sr \ V},$$

for me charged panicle beam, which essentially corresponds to the value determined in the "calculation method" using (Formula 1) according to above "Example 1", if the same retrieved focus beam profile $g_f$ is used and corresponding parameter values for (NA), ($I_p$), and (LE). Accordingly, the "brightness fitting method" and the "calculation method" can be used as alternative methods for accurately determining the brightness of the charged particle beam, or both methods can be used for increasing the reliability of the obtained brightness value.

Experiments have shown that brightness values of charged particle beams obtained in accordance with the methods described herein agree very well with the expectations. Compared with available methods, methods described herein are beneficial for the following reasons. The brightness of the charged particle beam can be actually measured in any charged particle beam column, wherein no special tools or optics or device geometries are required. This allows the analysis of beam emitter variations and also allows for a full modelling of the charged particle beam: the brightness can be used as a spot simulation parameter.

Source Size Determination

According to another aspect described herein, the brightness $B_r$ of the charged particle beam is used for determining the size of the source of the charged particle beam, particularly the virtual source size, particularly the virtual source size of an electron emission tip.

Figure 5:
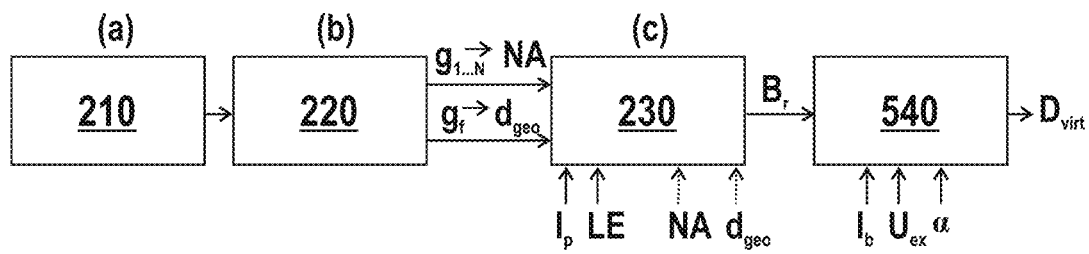
FIG. 5 shows a schematic flow diagram illustrating a method of determining a size of a source of charged particles according to embodiments described herein.
Figure 6:
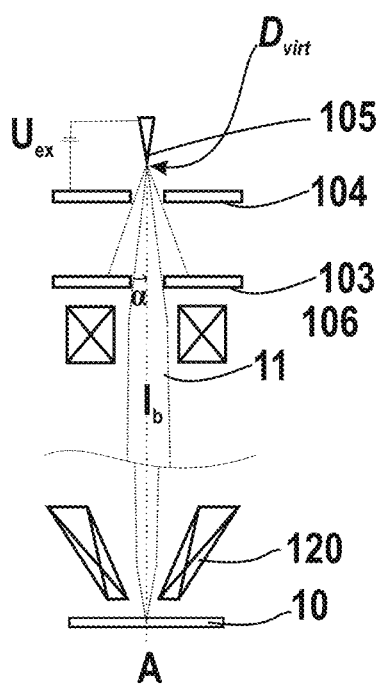
FIG. 6 is a schematic view of a source region of a charged particle beam imaging device for illustrating a method of determining a size of the source according to embodiments described herein.

FIG. 5 shows a schematic flow diagram illustrating a method of determining the size of a source of charged particles according to embodiments described herein, and FIG. 6 is a schematic view of a source region of a charged particle beam imaging device for illustrating the method of FIG. 5.

A method of determining a size (particularly, the virtual source size $D_{virt}$) of the source 105 of the charged particle beam 11 in a charged particle beam imaging device includes the following: The charged particle beam 11 is generated with the source 105, wherein the source may include an emission tip from which the charged particles, particularly the electrons, are emitted. The charged particle beam 11 is focused toward the sample 10 with the focusing lens 120. The brightness ($B_r$) of the charged particle beam is determined according to any of the methods described herein, particularly by taking one or more images of the sample with the charged particle beam imaging device (box 210), retrieving one or more beam profiles of the charged particle beam from the one or more images (box 220), and determining the brightness $B_r$ of the charged particle beam based on at least the one or more beam profiles, the probe current ($I_p$) of the charged particle beam, and the landing potential (LE) of the charged particle beam (box 230), e.g., using the above "fitting method" or the above "calculation method". In particular, the brightness $B_r$ of the charged particle beam can be determined based on the focus beam profile $g_f$, the numerical aperture (NA), the probe current ($I_p$), and the landing potential (LE). Alternatively, one of $d_{geo}$ and (NA) may also be determined otherwise (see dashed arrows in FIG. 5).

As is illustrated by box 540 in FIG. 5, the size ($D_{virt}$) of the source 105 can be determined based on at least the brightness ($B_r$) determined in box 230. In particular, the size ($D_{virt}$) can be determined based on at least the brightness ($B_r$), a charged particle beam energy ($U_{ex}$), a charged particle beam current ($I_b$), and a source opening angle ($\alpha$).

The source size determination method described herein is based on the finding that the (reduced) brightness of the charged particle beam can be assumed to be a conserved parameter in the charged particle beam imaging device. Accordingly, the (reduced) brightness can be determined at the beam probe focused on the sample (which is at a "downstream" position along the beam) and be used for reliably determining the source size (which is at an "upstream" position along the beam). Hereby, it is not necessary that the probe current ($I_p$) impinging on the sample corresponds to the beam current ($I_b$) of the charged particle beam initially generated by the source, and also the beam potential of the charged particle beam (corresponding to the acceleration/deceleration potential the beam particles are respectively exposed to) may vary along the optical axis. For example, the landing potential LE (corresponding to the landing energy on the sample) may be lower than an initial beam potential (corresponding to an initial particle energy in the beam column caused by the extractor potential), e.g., due to a retarding field lens component of the focusing lens 120.

The beam potential of the charged particle beam may correspond to an electron potential expressed in [V] (or an electron energy expressed in [eV]) caused by a potential difference between the source and a beam acceleration potential, particularly a potential of an extractor electrode 104. Specifically, the beam potential may correspond to the potential difference between the emission tip of the source 105 and the potential of an extractor electrode 104 that accelerates the electrons emitted by the emission tip to the charged particle beam energy within the beam column. An example value of the extractor potential is $U_{ex}$=7 kV The source opening angle ($\alpha$) may be determined based on an aperture dimension of a beam limiting aperture 103 that is arranged downstream of the source 105 and an aperture distance of the beam limiting aperture 103 from the source 105. The beam limiting aperture may be an aperture that limits the charged particle beam, i.e., that blocks an outer edge region of the charged particles emitted by the source 105 and that hence forms the charged particle beam 11 emitted from the emission tip and propagating along the optical axis A within the beam column of the charged particle beam imaging device.

In particular, the source opening angle ($\alpha$) may be calculated by $D_a/2X_a$, wherein $D_a/2$ is half the diameter of the beam limiting aperture 103, and $X_a$ is the aperture distance of the beam limiting aperture 103 from the emission tip of the source, which is considerably larger than the diameter $D_a$ of the beam limiting aperture, such that $\tan(\alpha) \approx \alpha$. For example, the diameter $D_a$ of the beam limiting aperture 103 may be 0.08 mm and the distance $X_a$ may be 80 mm, such that $\alpha = 0.5$ mrad.

The charged particle beam current ($I_b$) may correspond to a current of the charged particle beam 11 in a column of the charged particle beam imaging device, particularly downstream of the beam limiting aperture 103 that may define the beam current inside the column propagating along the optical axis A. For example, the beam current ($I_b$) may be in a range from 20 to 200 pA, e.g., 150 pA.

According to embodiments, which can be combined with other embodiments described herein, the virtual size ($D_{virt}$) of the source 105 is calculated using the following formula $$D_{virt} = \sqrt{\frac{4 I_b}{B_r \pi^2 \alpha^2 U_{ex}}},$$ (Formula 2)

wherein ($B_r$) is the brightness of the charged particle beam, ($I_b$) is the charged particle beam current, ($\alpha$) is the source opening angle, and ($U_{ex}$) is the charged particle beam potential. Also here, the relativistically corrected value may be used for the charged particle beam potential $U_{ex}$, which may reasonable if the charged particle beam potential is high (e.g., >10 keV), i.e., if the beam acceleration voltage is high. The relativistically corrected value $U_{cor}$ can be calculated from the respective uncorrected value U as follows:

$$U_{cor} = U \left(1 + \frac{e}{2\ mc^2} U\right).$$

Using the exemplary parameter values mentioned above, the calculation yields the following source size $$D_{virt} = \sqrt{\frac{4 \cdot 150 \text{ pA}}{4 \cdot 10^8 \frac{A}{m^2 sr\ V} \pi^2 (0.5\ mrad)^2 7\ kV}} \approx 9 \text{ nm}$$

The above example calculation yields a virtual size of the source 105 of about 9 nm.

According to embodiments described herein, the size of the source is determined based on the actual brightness of the beam that is generated by the source. Accordingly, the determined size corresponds well to the area of the emission tip from which the charged particles appear to originate when back-tracing the charged particle beam.

Further embodiments relate to a charged particle beam imaging system with a processor and a memory storing instructions that, when executed by the processor, cause the charged particle beam imaging device to carry out any of the methods described herein, particularly a method of determining the brightness of the charged particle beam and/or a method of determining the size of the source of the charged particle beam. The charged particle beam imaging device described herein may be configured to be operated according to any of the methods described herein. Specifically, one or more of the methods described herein can be carried out with the charged particle beam imaging device.

Specifically, the following embodiments are described herein:

Embodiment 1: A method of determining a brightness of a charged particle beam (11) focused by a focusing lens (120) toward a sample (10) in a charged particle beam imaging device (100), the method comprising: (a) taking one or more images ($h_{f, 1 \ldots N}$) of the sample with the charged particle beam imaging device; (b) retrieving one or more beam profiles ($g_{f, 1 \ldots N}$) of the charged particle beam from the one or more images; and (c) determining the brightness ($B_r$) of the charged particle beam (11) based on at least the one or more beam profiles ($g_{f, 1 \ldots N}$), a probe current ($I_p$) of the charged particle beam, and a landing potential (LE) of the charged particle beam.

Embodiment 2: The method of embodiment 1, wherein, in (a), one or more images ($h_{1 \ldots N}$) of the sample (10) are taken when the sample is arranged at one or more defocus distances ($z_{1 \ldots N}$) from a respective beam focus of the charged particle beam, the method further comprising: determining one or more beam widths ($c_{1 \ldots N}$) from the one or more beam profiles ($g_{1 \ldots N}$); and calculating a numerical aperture (NA) of the charged particle beam based on the one or more beam widths ($c_{1 \ldots N}$) and the one or more defocus distances ($z_{1 \ldots N}$), wherein, in (c), the brightness of the charged particle beam is determined based on at least the numerical aperture (NA), the probe current ($I_p$), and the landing potential (LE).

Embodiment 3: The method of embodiment 2, wherein the one or more defocus distances ($z_{1 \ldots N}$) at which the one or more images are taken, or differences between the one or more defocus distances, are known in absolute values, and said absolute values are used for calculating the numerical aperture (NA).

Embodiment 4: The method of embodiment 2 or 3, wherein the numerical aperture (NA) of the charged particle beam is calculated based on an average change of beam width as a function of defocus distance, and optionally a calibration factor.

Embodiment 5: The method of any of embodiments 1 to 4, wherein, in (a), at least one image ($h_f$) of the sample is taken when the sample is arranged at a beam focus of the charged particle beam (11), in (b), a focus beam profile ($g_f$) is retrieved from the at least one image ($h_f$), and, in (c), the brightness of the charged particle beam is determined based on the focus beam profile ($g_f$), a numerical aperture (NA) of the charged particle beam, the probe current ($I_p$), and the landing potential (LE). The numerical aperture (NA) can be determined in accordance with any of embodiments 2 to 4 or can be determined otherwise.

Embodiment 6: The method according to embodiment 5, wherein a focus spot size of the charged particle beam, particularly a focus spot diameter ($d_{geo}$), more particularly a full width 50 diameter, is retrieved from the focus beam profile ($g_f$), and, in (c), the brightness of the charged particle beam is determined based on the focus spot size, the numerical aperture (NA), the probe current ($I_P$), and the landing potential (LE).

Embodiment 7: The method of any of embodiments 1 to 6, wherein, in (c), the brightness ($B_r$) is determined by calculation using the following formula:

$$B_r = \frac{4 I_p}{\pi^2 d_{geo}^2 (NA)^2 (LE)}$$ (Formula 1)

wherein NA is a numerical aperture of the charged particle beam, $I_p$ is the probe current, LE is the landing potential (corresponding to the landing energy), and $d_{geo}$ is the focus spot diameter of the charged particle beam. The relativistically corrected value may optionally be used for the landing potential, in particular if the landing potential is high, e.g., 10 keV or more.

Embodiment 8: The method according to embodiment 5, comprising: (c1) simulating a focus beam profile using at least the numerical aperture (NA), the probe current ($I_p$), the landing potential (LE), and an estimated brightness ($B_{est}$) as input parameters to provide a simulated focus beam profile; (c2) comparing the simulated focus beam profile with the retrieved focus beam profile for determining a magnitude (R) of a difference therebetween; and (c3) varying the estimated brightness ($B_{est}$) to provide an updated brightness ($B_{i+1}$), and repeating (c1) and (c2) in an iterative process for minimizing said magnitude (R).

Embodiment 9: The method according to embodiment 8, wherein (c1) and (c2) are repeated until a minimized magnitude ($R_{min}$) of the difference between the simulated focus beam profile and the retrieved focus beam profile is obtained, and the updated brightness at which the magnitude of the difference is small or minimized is determined as the brightness ($B_r$) of the charged particle beam.

Embodiment 10: The method according to any of embodiments 1 to 9, wherein the charged particle beam is an electron beam that has one or more of the following parameter values: the probe current ($I_p$) is in a range from 1 nA to 5 nA, the landing potential (LE) corresponds to a landing energy in a range from 200 eV to 5 keV, and/or a numerical aperture (NA) is in a range from 3 mrad to 10 mrad.

Embodiment 11: The method according to any of embodiments 1 to 10, wherein, in (b), retrieving the one or more beam profiles from the one or more images comprises dividing the one or more images in Fourier space by a high-resolution image ($h_{HR}$) of the sample in Fourier space, or wherein the one or more beam profiles in (b) are retrieved from the one or more images based on a deconvolution.

Embodiment 12: The method according to any of embodiments 1 to 11, wherein, in (a), the charged particle beam (11) is focused by the focusing lens (120) toward the sample (10) such that a focus spot size is brightness-limited, particularly such that a geometric spot size is bigger than each of a diffraction contribution, a chromatic blur contribution, and a spherical blur contribution to the focus spot size of the charged particle beam.

Embodiment 13: The method according to any of embodiments 1 to 12, further comprising taking a high-resolution image ($h_{HR}$) of the sample, particularly with a second resolution that is higher than a first resolution of the one or more images taken in (a), wherein, in (b), the one or more beam profiles of the charged particle beam are retrieved by deconvolving the one or more images ($h_{f, 1 \ldots N}$) with the high-resolution image ($h_{HR}$) of the sample. For example, the second resolution may be improved relative to the first resolution by at least 30% or more, particularly by at least 50% or more.

Embodiment 14: A use of a brightness ($B_r$) of a charged particle beam (11) determined according to any of the methods described herein for determining a size ($D_{virt}$) of a source (105) of the charged particle beam (11), particularly the virtual source size of an electron emission tip.

Embodiment 15: A method of determining a size ($D_{virt}$) of a source (105) of a charged particle beam (11) in a charged particle beam imaging device (100), comprising: generating the charged particle beam (11) with the source (105); focusing the charged particle beam (11) toward a sample (10) with a focusing lens (120); determining a brightness ($B_r$) of the charged particle beam according to any of the methods described herein; and determining the size ($D_{virt}$) of the source (105) based on at least the brightness ($B_r$), a beam potential ($U_{ex}$) of the charged particle beam, a charged particle beam current ($I_b$), and a source opening angle ($\alpha$).

Embodiment 16: The method according to embodiment 15, wherein the beam potential ($U_{ex}$) corresponds to a potential difference between the source (105) and a beam acceleration potential, particularly a potential of an extractor electrode.

Embodiment 17: The method according to embodiment 15 or 16, wherein the source opening angle ($\alpha$) is determined based on an aperture dimension of a beam limiting aperture (103) downstream of the source (105) and an aperture distance of the beam limiting aperture (103) from the source (105).

Embodiment 18: The method according to any of embodiments 15 to 17, wherein the size ($D_{virt}$) of the source (105) is calculated using the following formula:

$$D_{virt} = \sqrt{\frac{4 I_b}{B_r \pi^2 \alpha^2 U_{ex}}} \qquad \text{(Formula 2)}$$

wherein $B_r$ is the brightness of the charged particle beam, $I_b$ is the charged particle beam current, $\alpha$ is the source opening angle, and $U_{ex}$ is the beam potential. The relativistically corrected value may optionally be used for the beam potential, in particular if the beam potential is high, e.g., 10 keV or more.

Embodiment 19: A charged particle beam imaging device (100), comprising: a source (105) for emitting a charged particle beam (11) propagating along an optical axis (A); a sample stage (108); a focusing lens (120) for focusing the charged particle beam toward a sample (10) placed on the sample stage (108); a charged particle detector (118) for detecting signal particles emitted from the sample (10); and a processor (170) and a memory storing instructions that, when executed by the processor, cause the charged particle beam imaging device (a) to take one or more images ($h_{f, 1 \ldots N}$) of the sample; (b) to retrieve one or more beam profiles ($g_{f, 1 \ldots N}$) of the charged particle beam from the one or more images; and (c) to determine a brightness ($B_r$) of the charged particle beam based on at least the one or more beam profiles ($g_{f, 1 \ldots N}$), a probe current ($I_p$) of the charged particle beam, and a landing potential (LE) of the charged particle beam.

Embodiment 20: The charged particle beam imaging device according to embodiment 19, wherein the instructions, when executed by the processor (170), further cause the charged particle beam imaging device (100) to determine a size ($D_{virt}$) of the source (105) based on the brightness ($B_r$) of the charged particle beam, particularly based on the brightness ($B_r$), a beam potential of the charged particle beam ($U_{ex}$), a charged particle beam current, and/or a source opening angle ($\alpha$). The processor (170) may calculate the size ($D_{virt}$) based on above (Formula 2).

While the foregoing is directed to embodiments, other and further embodiments may be devised without departing from the basic scope thereof, and the scope thereof is determined by the claims that follow.

The invention claimed is:

1. A method of determining a brightness of a charged particle beam focused by a focusing lens toward a sample in a charged particle beam imaging device, the method comprising:
   (a) taking one or more images of the sample with the charged particle beam imaging device;
   (b) retrieving one or more beam profiles of the charged particle beam from the one or more images; and
   (c) determining the brightness of the charged particle beam based on at least the one or more beam profiles, a probe current of the charged particle beam, and a landing potential of the charged particle beam.

2. The method of claim 1, wherein, in (a), one or more images of the sample are taken when the sample is arranged at one or more defocus distances from a respective beam focus of the charged particle beam, the method further comprising:
   determining one or more beam widths from the one or more beam profiles; and
   calculating a numerical aperture of the charged particle beam based on the one or more beam widths and the one or more defocus distances,
   wherein, in (c), the brightness of the charged particle beam is determined based on at least the numerical aperture, the probe current, and the landing potential.

3. The method of claim 2, wherein the one or more defocus distances at which the one or more images are taken, or differences between the one or more defocus distances, are known in absolute values, and said absolute values are used for calculating the numerical aperture.

4. The method of claim 2, wherein the numerical aperture of the charged particle beam is calculated based on an average change of beam width as a function of defocus distance, and optionally a calibration factor.

5. The method of claim 1, wherein
   in (a), at least one image of the sample is taken when the sample is arranged at a beam focus of the charged particle beam,
   in (b), a focus beam profile is retrieved from the at least one image, and
   in (c), the brightness of the charged particle beam is determined based on at least the focus beam profile, a numerical aperture of the charged particle beam, the probe current, and the landing potential.

6. The method according to claim 5, wherein a focus spot size of the charged particle beam is retrieved from the focus beam profile, and
   in (c), the brightness of the charged particle beam is determined based on the focus spot size, the numerical aperture, the probe current, and the landing potential.

7. The method of claim 6, wherein, in (c), the brightness is determined by calculation using following formula:

$$B_r = \frac{4\,I_p}{\pi^2 d_{geo}^2 (NA)^2 (LE)} \quad \text{(Formula 1)}$$

wherein NA is the numerical aperture of the charged particle beam, $I_P$ is the probe current, LE corresponds to the landing potential, and $d_{geo}$ is a focus spot diameter of the charged particle beam.

8. The method according to claim 5, comprising:
   (c1) simulating a focus beam profile using at least the numerical aperture, the probe current, the landing potential, and an estimated brightness as input parameters to provide a simulated focus beam profile;
   (c2) comparing the simulated focus beam profile with the focus beam profile retrieved in (b) for determining a magnitude of a difference therebetween; and
   (c3) varying the estimated brightness to provide an updated brightness, and repeating (c1) and (c2) in an iterative process for minimizing said magnitude.

9. The method according to claim 8, wherein (c1) and (c2) are repeated until a minimized magnitude of the difference between the simulated focus beam profile and the retrieved focus beam profile is obtained, and the updated brightness at that iteration is determined as the brightness of the charged particle beam.

10. The method according to claim 1, wherein the charged particle beam is an electron beam that has one or more of the following parameter values: the probe current is in a range from 1 nA to 5 nA, the landing potential corresponds to a landing energy in a range from 200 eV to 5 keV, and a numerical aperture of the charged particle beam is in a range from 3 mrad to 10 mrad.

11. The method according to claim 1, wherein, in (b), retrieving the one or more beam profiles from the one or more images comprises dividing the one or more images in Fourier space by a high-resolution image of the sample in Fourier space, or wherein the one or more beam profiles in (b) are retrieved from the one or more images based on a deconvolution.

12. The method according to claim 1, wherein, in (a), the charged particle beam is focused by the focusing lens toward the sample such that a focus spot size is brightness-limited, particularly such that a geometric spot size is bigger than each of a diffraction contribution, a chromatic blur contribution, and a spherical blur contribution to the focus spot size of the charged particle beam.

13. The method according to claim 1, further comprising:
   taking a high-resolution image of the sample with a second resolution that is higher than a first resolution of the one or more images taken in (a),
   wherein, in (b), the one or more beam profiles of the charged particle beam are retrieved by deconvolving the one or more images with the high-resolution image of the sample.

14. A use of a brightness of a charged particle beam determined according to the method of claim 1 for determining a size of a source of the charged particle beam.

15. A method of determining a size of a source of a charged particle beam in a charged particle beam imaging device, comprising:
   generating the charged particle beam with the source;
   focusing the charged particle beam toward a sample with a focusing lens;
   determining a brightness of the charged particle beam according to the method of claim 1; and
   determining the size of the source based on at least the brightness, a beam potential of the charged particle beam, a charged particle beam current, and a source opening angle.

16. The method according to claim 15, wherein the beam potential is caused by a potential difference between the source and a beam acceleration potential.

17. The method according to claim 15, wherein the source opening angle (α) is determined based on an aperture dimension of a beam limiting aperture downstream of the source and an aperture distance of the beam limiting aperture from the source.

18. The method according to claim 15, wherein the size of the source is calculated using following formula:

$$D_{virt} = \sqrt{\frac{4 I_b}{B_r \pi^2 \alpha^2 U_{ex}}} \quad \text{(Formula 2)}$$

wherein $B_r$ is the brightness of the charged particle beam, $I_b$ is the charged particle beam current, $\alpha$ is the source opening angle, and $U_{ex}$ is the beam potential.

19. A charged particle beam imaging device, comprising:
a source for emitting a charged particle beam propagating along an optical axis;
a sample stage;
a focusing lens for focusing the charged particle beam toward a sample placed on the sample stage;
a charged particle detector for detecting signal particles emitted from the sample; and
a processor and a memory storing instructions that, when executed by the processor, cause the charged particle beam imaging device
(a) to take one or more images of the sample;
(b) to retrieve one or more beam profiles of the charged particle beam from the one or more images; and
(c) to determine a brightness of the charged particle beam based on at least the one or more beam profiles, a probe current of the charged particle beam, and a landing potential of the charged particle beam.

20. The charged particle beam imaging device according to claim 19, wherein the instructions, when executed by the processor, further cause the charged particle beam imaging device to determine a size of the source based on at least the brightness of the charged particle beam.

* * * * *